United States Patent [19]

Retrum

[11] 4,231,926

[45] Nov. 4, 1980

[54] METHOD AND APPARATUS FOR HYDROLYZING KERATINACEOUS MATERIAL

[76] Inventor: Rowland Retrum, 1226 Wilton La., Kirkwood, Mo. 63122

[21] Appl. No.: 968,479

[22] Filed: Dec. 11, 1978

[51] Int. Cl.$^2$ .............................. C07G 7/00; A23J 1/10
[52] U.S. Cl. ............................. 260/123.7; 260/112 R; 426/455; 426/456; 426/657
[58] Field of Search ........................ 260/123.7, 112 R; 426/455, 456

[56] References Cited

U.S. PATENT DOCUMENTS

| 2,702,245 | 2/1955 | Mayer | 260/112 R X |
|---|---|---|---|
| 3,272,632 | 9/1966 | Speer | 426/438 |
| 3,617,313 | 11/1971 | Harrington et al. | 204/16 X |
| 4,151,306 | 4/1979 | Williams et al. | 260/123.7 X |

FOREIGN PATENT DOCUMENTS 1030515  5/1966  United Kingdom ..................... 426/644

Primary Examiner—Walter C. Danison
Attorney, Agent, or Firm—Paul M. Denk

[57] ABSTRACT

An apparatus for effecting the continuous conversion of feathers, hair, and other keratinaceous material into usable products; including a first vessel, said first vessel being jacketed and capable of heating the material therein without subjecting it to pressure, and paddles disposed for violently agitating the material within the vessel while gradually traversing it therethrough; a second vessel, a pump interconnected between the two vessels and providing for the transfer of the now fluidized material from the first vessel and into the second vessel while preventing the escape of any second vessel pressure back into the first vessel, the second vessel being jacketed and capable of heating the fluidized and flowable material therein to elevated temperatures while agitating the same to effect its hydrolyzation, and another pump connecting with the outlet side of the second vessel to provide for continuous discharge of the now hydrolyzed material and some pressure while the second vessel continuously hydrolyzes additional incoming material while creating supplemental pressure in order to maintain the desired pressure and temperature therein.

10 Claims, 4 Drawing Figures

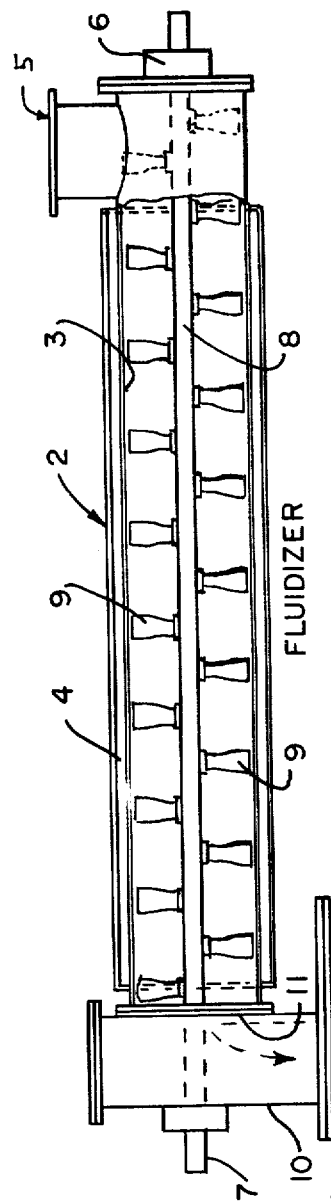
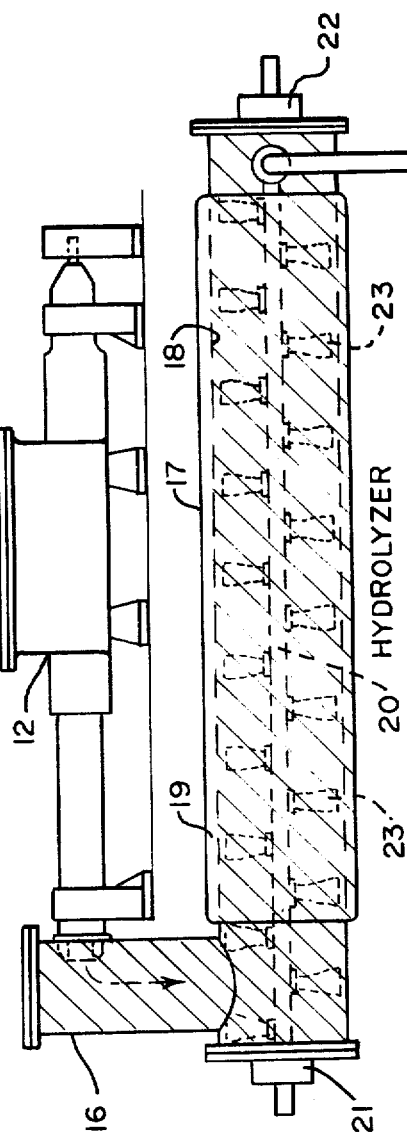
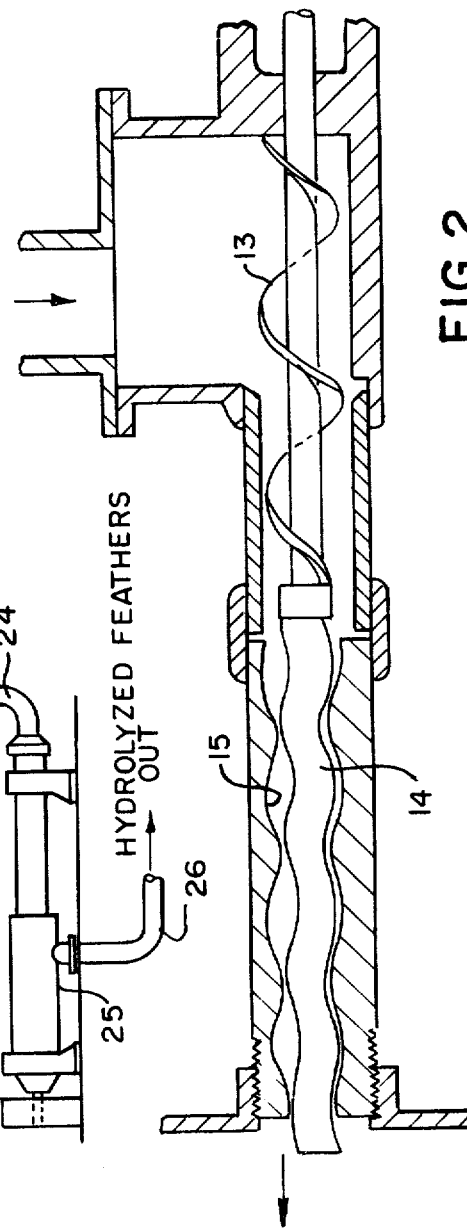
FIG. 1.
FIG. 2.

METHOD AND APPARATUS FOR HYDROLYZING KERATINACEOUS MATERIAL

BACKGROUND OF THE INVENTION

This invention relates generally to the hydrolysis of keratinaceous material, but more specifically pertains to the continuous processing of keratinaceous material for effecting its sustained hydrolyzation.

In the prior art apparatuses and processes for effecting hydrolyzation of materials, including feathers, normally such processes incorporate structures that provide for the batch handling of such material to accomplish this desired result. One can readily see that the problem with the batch type of operation is that a substantial amount of time is required to load the standard vessel in which the feathers or other material are treated, and wherein the material may then be subjected to some agitation, before the feathers are either transferred to another vessel, or subjected to build up of heat and consequent pressure within that same vessel to effect their desired hydrolysis. Thus, and as can be readily understood, the necessary time for effecting the entire batch process in achieving the necessary temperature and pressure elevation, and chemical reaction, is substantial, and as is well known in the art, typically it may take as much as thirty minutes to load the standard vessel employed in this type of an operation, a quarter hour to build up the desired temperature and pressure through the indirect application of heat, an additional half hour or more at the desired temperature and pressure within the vessel to then accomplish the hydrolyzation process, followed by the pressure and temperature reduction period which may last as long as an hour before the batch of hydrolyzed feathers can be discharged or otherwise removed. Following this, such hydrolyzed material is then dried by the further application of heat. Hence, the batch process is ordinarily slow, cumbersome, and inefficient to the extent that it cannot readily submit to automation, and furthermore, is liable to produce a variation in the degree of hydrolyzation of the end product obtained because of the variableness of the heat treatment that occurs during the extended exposure time.

An example of an apparatus and its method of operation for the conversion of feathers by way of hydrolysis is shown in the United States patent to Mayer, U.S. Pat. No. 2,702,245. In this patent there is described the concept that feathers can be steam treated by indirect application of heat to wet feathers in the batch process, with some agitation, while consuming a quantity of time in excess of at least one and one-half hours.

Another example of a partial batch type process for preparing feathers for hydrolyzation is shown in my earlier U.S. Pat. No. 3,830,850, which discloses means for shredding feathers mechanically into pieces of relatively small size that are then rendered rather pumpable if carried within a certain quantity of water. But, the crushed feather pieces are not presoftened, are not heat treated within the process, and in addition, it has been found that the shredding process requires a significant amount of power that renders the process rather uneconomical.

The U.S. patent to Speer, U.S. Pat. No. 3,272,632, discloses an apparatus and its process of use in converting offal and feathers for further commercial usage. This patent describes the process in which poultry by-products, such as offal, blood, and feathers are converted into a usable food product by subjecting them to heat, or cooking, in a hot oil bath and at elevated temperatures. While this type of technique produces a usable end product, quality control is rather difficult to maintain, and in addition, the operation is performed multi stepped in nature, and for reasons previously explained, is rather uneconomical and inefficient.

The U.S. patent to Harrington, Jr., U.S. Pat. No. 3,617,313, discloses the hydrolyzing process in which feathers are compressed and formed in a continuous flow into a plug that is designed to seal the infeed to the hydrolyzing retort so as to prevent the escape of retort pressure, and therein effecting somewhat of hydrolyzation in a form of continuous flow. Such infeed sealing, however, is very much dependant upon the physical characteristics of the feathers being substantially undiluted by other material such as blood or offal. And, since such dilution of raw material, such as feathers, by this type of offal is relatively common, the infeed seal of this type of hydrolyzing apparatus is very difficult to maintain consistently, and cannot be maintained on all materials that are typically included within the offal hydrolyzing process, and therefore, substantially limits the applicability of the process defined.

Various other U.S. patents, prior in issuance, and that disclose variations in the methods and apparatuses for hydrolyzing cellulostic materials, including keratinaceous materials and vegetable substances, are shown in the earlier U.S. patents to Wallace, U.S. Pat. No. 2,681,871, Zebarth et al, U.S. Pat. No. 3,475,178, Wallace et al, U.S. Pat. No. 2,739,086, Shaw, U.S. Pat. No. 833,422, Maybee, U.S. Pat. No. 1,565,282, Docken, U.S. Pat. No. 3,071,468, and the prior U.S. patent to Geiger et al, U.S. Pat. No. 695,878.

It is also known that a process is used wherein feathers are converted into a usable product, as by way of hydrolyzation, but requires two steps in its performance. In the initial step, which is inherently batch in nature, the wet feathers are subjected to an intermediate pressure and temperature but without any agitation, in order to convert them into the pumpable consistency, while in the second step, the pressurized feathers are batch pumped into an agitated hydrolyzing retort, for batch hydrolyzation at elevated temperatures and pressure. This process, however, maintains a batching type of operation at least in its initial stages where the feathers are rendered more flowable, and therefore, it is not a fully continuous operation, cannot be readily automated because of the pretreating process performed upon the feathers; and in addition, because of the variable time of retention of the feathers under pressure and heat that is inherent in a first step of this nature, the extended vessel unloading time of the initial batch is likely to produce some if not substantial variation in the end product derived and before it is flowed into the hydrolyzing retort.

It is, therefore, the principal object of this invention to provide a fully continuous process for the production of usable food products from feathers, hair, nails, horns, hooves, and any other related keratinaceous materials.

It is another object of this invention to provide a fully continuous process for the production of usable food products from feathers, and other related keratinaceous materials, all with improved efficiency, while yielding a product having substantially improved nutritional value.

It is a further object of this invention to provide a fully continuous process wherein feathers, hair, and other keratinaceous materials can be converted, at high efficiency, and under very controllable conditions, in combination with other poultry and animal by-products such as blood, offal, and the like, into a combination of food products having high nourshing value.

Yet another object of this invention is to provide a continuous process for hydrolyzing keratinaceous products, such as feathers, through the agency of interrelated fluidizing and hydrolyzing vessels that provide for the continuous flow of the hydrolyzing material through such apparatus without a significant increase in the heat and pressure required during processing.

Yet another object of this invention is the provision of apparatus for hydrolyzing feathers, or the like, wherein both fluidizing and hydrolyzing vessels are interconnected by a pump means that effectively regulates the flow of the hydrolyzing product while at the same time maintaining consistency in the apparatus environment, thereby assuring quality control.

Another object of this invention is to provide an improved method for hydrolyzing feathers, or other keratinaceous materials, through the application of violent agitation of said products at least in its fluidizing vessel, and perhaps also within the connecting hydrolyzing vessel, thus greatly reducing the time required for hydrolization at a given pressure and temperature.

Still another object of this invention is the provision of apparatus for use in the processing of hydrolyzable materials, and wherein such materials are rendered significantly fluidized by the products being wilted and reduced into significantly smaller components for enhancing the product flowage through the operating apparatus.

Still an additional object of this invention is the assembly of hydrolyzing apparatus from a convenient arrangement of available vessels and pumps, but yet which provides for the continuous processing, as distinguished from the batch type processing, as is known in the art, for effecting sustained product hydrolyzation.

Another object of this invention is to provide a hydrolyzing apparatus and process that requires a minimum of supervision during its performance, but at the same time, and due to the continuity of its operations, assures highly effective quality control of the resultant hydrolyzed end product.

These and other objects will become more apparent to those skilled in the art upon reviewing the summary of this invention, and upon undertaking the study of the description of the preferred embodiment, in view of its drawings.

SUMMARY OF THE INVENTION

The subject of this invention provides a fully continuous process for the conversion of feathers, hair, or other keratinaceous materials, alone or in conjunction with additional poultry or animal by-products, and at a relatively high degree of efficiency and controllability into food products of improved nutritional value.

Perhaps before a detailed analysis of the structure of this invention is undertaken, a review of the hydrolyzation process of keratins may be made. The keratins and the hydrolyzation process are both extremely complex, and the available information on the subject is not always in accord. Because most investigative work in this field has been done principally upon feathers, explanation can then best be made in terms of the feather keratin.

The feather keratins are a complex organized, that is systematically arranged, protein that is comprised of some eighteen different known amino acids of varying value and essentially to the formation of body tissue. Processed, or hydrolyzed, feathers are the major source of cystine, a product which is valuable in itself but also vary valuable because it spares the need for expensive methionine, in that it allows for the use of less methionine.

In their natural condition, the keratins, such as is in feathers, are nearly indigestible to the animal stomach, 90% more or less of the product being indigestible in their natural state. Essentially keratins of this nature will pass directly through the digestive tract of the animal unused, mainly because of their great resistance to attack by the digestive juices and enzymes in the animal.

Keratins, like other proteins, consist of chains of amino acids joined by peptide cross-links, the amino group of one combining with the carboxyl group of the adjacent one, and so on, until as many as several thousand amino acids may be linked into a single protein molecular chain. In their native state, these molecular chains are arranged with respect to each other in an orderly manner, largely in the form of what may be defined as zig-zag-like chains within pleated sheets, or closely-packed helical coils, or in a combination of both. These molecular chains are interconnected primarily by hydrogen bonds, and the amino acids within the chains—and to some extent between the chains—are interconnected by the peptide cross-links.

The process that is most universally used for treating keratinaceous feathers to improve their digestibility is the method of exposing them to water at elevated temperatures, a process that may be generally identified as the steam hydrolysis method. Other processes that have been developed in attempting to improve upon the steam hydrolysis include the enzymatic, acids, or alkali hydrolysis, but such processes are overly expensive, or they may be destructive to the essential amino acids, and therefore, virtually unusable commercially.

As is known, feathers are softened by water at elevated temperatures. A temperature of 212° F. can be obtained at atmospheric pressure; while the rate of hydrolysis at that temperature is relatively negligible, the hot water does have an effect on the physical character of the feathers per se. Essentially the hot water has a tendency to remove the waxy coating upon the feathers and make them rather soggy, limp, and frangible, so that they may be susceptible to break up into pieces if flailed mechanically.

The hydrogen bond between the molecular chains, and the peptide cross-links between the amino acids, can be broken by steam, enzymatic action, or by chemical hydrolysis. This frees the chains to unfold or unwind in a random manner. When this occurs, the protein loses its original native property and is said to be generally disorganized or denatured, even though there is no manifested change in its composition. In this condition, its susceptibility to attack by digestive juices and enzymes is significantly increased.

Keratins have high proportions of cystine among their constituent amino acids. These exist as part of the peptide link. The cystine cross-link is called a disulfide cross-link because its central bond is between two sulfur atoms. Breakage of the cystine disulfide cross-links releases the cystine that is then partially converted into lanthionine, ornithine, and possibly other sulfur containing compounds, but principally the former, which is an unusual and non-essential amino acid, normally not present in the natural feathers. Cystine is virtually the only one of the eighteen amino acids that shows a significant reduction in analytical amount during typical steam hydrolysis.

Unfortunately, the unfolding of the keratin chains is accompanied by an adverse effect that can be detected only by actual feeding tests, an effect that results in decrease of nutritional availability beyond a certain point in the processing. Optimum nutritional value results when the difference between the first effect (the unfolding) and the second effect (the degradation) is maximized. This occurs in typical steam hydrolysis when the pepsin digestibility of the dried feather meal, as measured by the standard AOAC method utilizing 0.2% pepsin, has reached approximately seventy-five percent. Above and below this point, the actual nutritional value drops off markedly.

The nutritional value of feather meal is customarily measured by feeding chickens for available sulfur-bearing amino acids, methionine and cystine, principally cystine, because these are the most valued elements in poultry feeding applications.

The relationship between the hydrolyzing temperature and the time required to achieve a seventy-five percent pepsin digestibility using direct steam injection, not necessarily a heat jacket, and without agitation, is indicated in FIG. 4, which figure is taken from the USDA Utilization Report No. 3, dated 1961. This of course is not the same as it would be with jacket heat and agitation, nor when maintaining the seventy-five percent digestibility criterion, but it is closely parallel in its analysis. One can readily note the rapidity with which the time for pepsin digestibility decreases as the temperature increases in feather hydrolyzation.

The relationship between the hydrolyzing time and pepsin digestibility, with heat supplied by direct steam injection, not necessarily by jacket heat, and without agitation, is indicated by the chart shown in FIG. 3, wherein its curve A, which also has been taken from the USDA Utilization Report No. 3, supra, discloses the relationship between time and temperature to achieve seventy percent pepsin digestibility of the hydrolyzed feathers. Again, the processing of feathers under this relationship, as shown in this chart, is not the same as it would be with jacket heat being applied to the hydrolyzing vessel, and with agitation therein, but at least the data of these two type of processes is rather parallel in relationship. One can also note the rapid initial increase in digestibility percents, which is then followed by slow but steady further increase in the same as time continues. In curve B of this FIG. 3, there is described the values obtained from the USDA data by multiplying the percent pepsin digestibility by the proportion of the cystine plus methionine retained after processing, and this computes as:

percent pepsin digestibility ×
$$\frac{\text{percent cystine + methionine in processed material}}{\text{percent cystine + methionine in original material}}$$

The resulting curve happens to describe, within normal processing time, roughly what happens to nutritional availability of sulfur-bearing amino acids. While the relationship breaks down under a more extended processing, it has some validity if one accepts the recorded conclusion that there are only small differences in availability between the different amino acids, and limits the conclusion to normal processing.

The actual decrease in nutritional availability beyond the point of seventy-five percent pepsin digestibility tends to exceed that of the curve calculated as indicated above, particularly at high processing temperatures. No simple explanation is available for that occurrence.

One possible explanation is that the amino acids can exist in either of two chemically indistinguishable forms. Feather amino acids may occur naturally in what is known as the L-form. When they are heated with alkali, such as hydrated lime, up to fifty percent of them are converted into the unnatural form known as the D-form, which is less efficiently utilized by the animal digestive systems. The conversion is called racemization. Since the function of the alkali is that of a catalyst, one can speculate that heat alone also may accomplish some conversion.

Another possible explanation is that high temperatures, or extended heating, and attendant oxidation, may cause the released free amino acids to undergo further complex reactions that include the re-establishment of some cross-linking. In any case, the factors acting to decrease the nutritional availability seem to occur more markedly at higher temperatures, to the degree that a high temperature short time cycle of hydrolization may lose more nutritional value than a medium temperature medium time cycle.

One should readily note that the effects of agitation on the hydrolyzing reaction at any given temperature, such as by means of violent agitation, greatly increases the speed of the hydrolyzation process. A given pepsin digestibility can be developed at a given temperature in much less time, or at a lower temperature in the same amount of time, with the additional ingredient of violent agitation. This is no doubt due to the effect of the agitation in improving heat transfer, breaking up the feathers, and increasing their exposure to the water ingredient.

Thus, this invention contemplates the addition of the concept of violently agitating the product to be hydrolyzed, such as feathers, and for two reasons. Initially, violently agitating the feathers while they are traversing through an initial or fluidizing vessel, and while some heat is being applied to the same, generally provides for a more accelerated wilting of the feathers, in their moisturous condition, thereby rendering the mass more fluidic in consistency, providing for its ease of flowability through the vessel, and for that matter, the entire hydrolyzing apparatus, for sustaining the continuous processing of the same. In addition, providing for a more fluidic condition for flowability of the feather-moisture mass furnishes a continuous and adequate seal at the pump for the second or hydrolyzing vessel into which the mass is continuously flowed for furnishing a continuous hydrolyzing process within said second vessel. Furthermore, and a further reason for exposing the feathery mass to violent agitation, at least within the fluidizing or first vessel, and perhaps even in the second or hydrolyzing vessel, is that the feathery mass is broken up into much smaller pieces which, as previously explained, has a tendency to increase product surface exposure to the hydrolyzing process and thereby greatly increase the speed of the chemical reaction. That the violent agitation, particularly within the fluidizing or first vessel, has a tendency to substantially increase the percentage of size reduction of the feather particles can be readily observed from the following chart of information.

PARTICLE SIZE, FLUIDIZED & NON-FLUIDIZED FEATHERS

|  | Broiler Feathers Unprocessed | Batch-Wilted Feathers | Fluidized Feathers | |
|---|---|---|---|---|
|  |  |  | Mild Agitation | Violent Agitation |
| Vessel diameter | — | 60" | 24" | 24" |
| Jacket temp. | — | About 225 F. | 340 F. | 340 F. |
| Agitator rpm | — | 50 | 90 | 250 |
| Time, minutes | — | Average, 15 | 15 | 15 |
| Percentages, particles of length indicated: |  |  |  |  |
| 0-¼" | 3 | 2 | 53 | 98 |
| ¼-1 | 5 | 7 | 36 | 1 |
| 1-1¼ | 29 | 24 | 8 | 1 |
| 1¼-2 | 25 | 25 | 1 |  |
| 2-2¼ | 21 | 25 | 1 |  |
| 2¼-3 | 4 | 9 | 1 |  |
| 3-3¼ | 4 | 1 |  |  |
| 3¼-4 | 1 | 3 |  |  |
| 4-4¼ |  | 2 |  |  |
| 4¼-5 | 1 | 1 |  |  |
| 5-5¼ | 3 |  |  |  |
| 5¼-6 | 2 | 1 |  |  |
| 6-6¼ | 2 |  |  |  |
| Total | 100 | 100 | 100 | 100 |
| Approximate bulk density, lbs. per cu ft | 30 | 40 | 40 | 40 |

As can be seen, the percentages of the smaller feather partical sizes are substantially increased when violent agitation is exerted upon the fluidizing feathers. For example, when mild agitation is exerted upon the feathers, only 53% of them are reduced in size down to between about 0 through ¼". On the other hand, when violent agitation is conducted upon the fluidized feathers, 98% of such feathery mass is reduced to partical sizes of less than one-half inch. In addition, and as has been previously explained with respect to prior art hydrolysis processing of feathers, whereas prior batch processes, particularly with respect to feathers, may have taken as long as three hours to achieve a fully hydrolyzed feather mass; under the method of this current invention this time is reduced down to less than or approximately one hour duration to obtain a complete final product.

The process of this invention is comprised of the following steps. The wet raw material, such as feathers, hair, or other keratinaceous materials, which may even include ground up hooves and toenails, and with water added if necessary to provide a certain degree of wetness, is subjected while under continuous flow, without pressurization, and while being vigorously agitated, to a hot, water-saturated atmosphere, within a first vessel. This first vessel, which may be defined as a fluidizer vessel, provides for a greater degree of softening of the feather or keratinaceous mass than can be obtained in the batch cooker. It is highly effective in breaking the feathers down into smaller or miniscule pieces, such action being highly dependent upon the violence of the agitation being urged upon the feathery mass within said vessel. The prior art type of batch cookers only stir the feathers as cooking occurs. The fluidizer vessel of this invention actually beats the feathers rather violently, and the violent agitation is so effective in reducing particle size that it can be controlled rather precisely, as illustrated in the chart of information previously analyzed within this summary. In this condition, the feathery material is of a sufficiently flowable condition as to be subjected to pumping in a continuous stream into a pressurized second vessel, which may be defined as the hydrolyzing vessel, and in which hydrolyzation of the mass into the digestible product occurs so as to improve its nutritional value, as previously explained. Following this, and as the hydrolyzing mass passes through the second vessel, by the time it reaches the outlet side of the same, it is once again pumped from the vessel, mainly through the effort of the pressure built up within the same, and to a location where it may be dried, either naturally, or by a heater, into a rather meal consistency, or it may be combined with other byproducts such as blood, offal, or the like, for joint drying to a combination meal of highly improved nutritional value. As is well know, a product of this nature is readily added particularly into animal and pet feeds for enhancing their nutritional value, particularly of the protein content.

The fully continuous character of the process of this invention makes it easily amenable to mechanization, and to fully automated quality control, while thus yielding a product of improved nutritional value that is processed at improved efficiency over what the prior art offers.

BRIEF DESCRIPTION OF THE DRAWINGS

In the drawings, FIG. 1 provides a schematic view of the fluidizing and hydrolyzing apparatus of this invention;

FIG. 2 discloses a schematic sectional view through a pump of the type that may be used for both urging the fluidized mass from the fluidizer and into the hydrolyzer, as shown in FIG. 1, and preventing the escape of any pressure from the latter vessel back into the fluidizer;

DESCRIPTION OF THE PREFERRED EMBODIMENT

Figure 3:
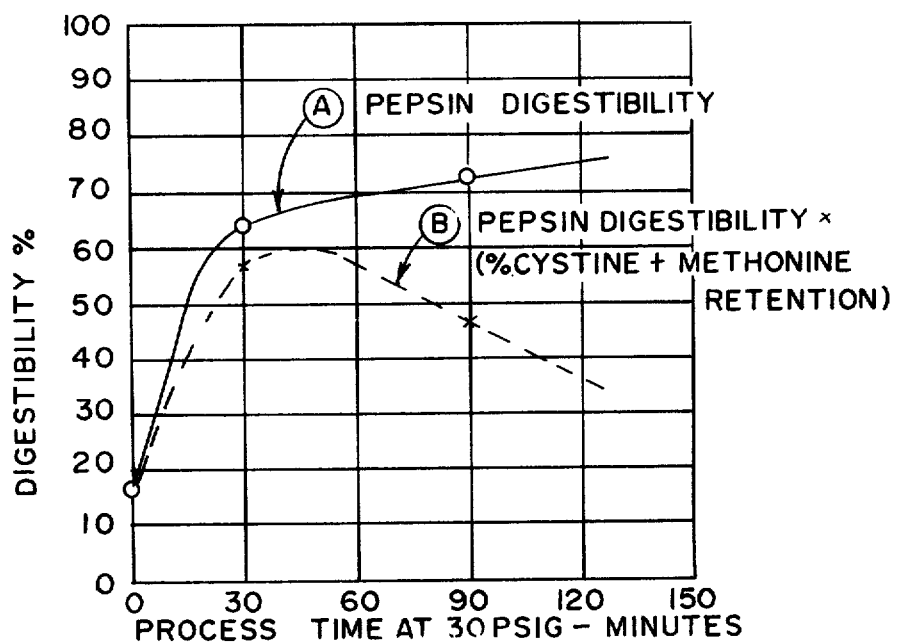
FIG. 3 discloses, as previously explained, the relationship between the hydrolyzing time and the development of pepsin digestibility for a feather mass under stated conditions.
Figure 4:
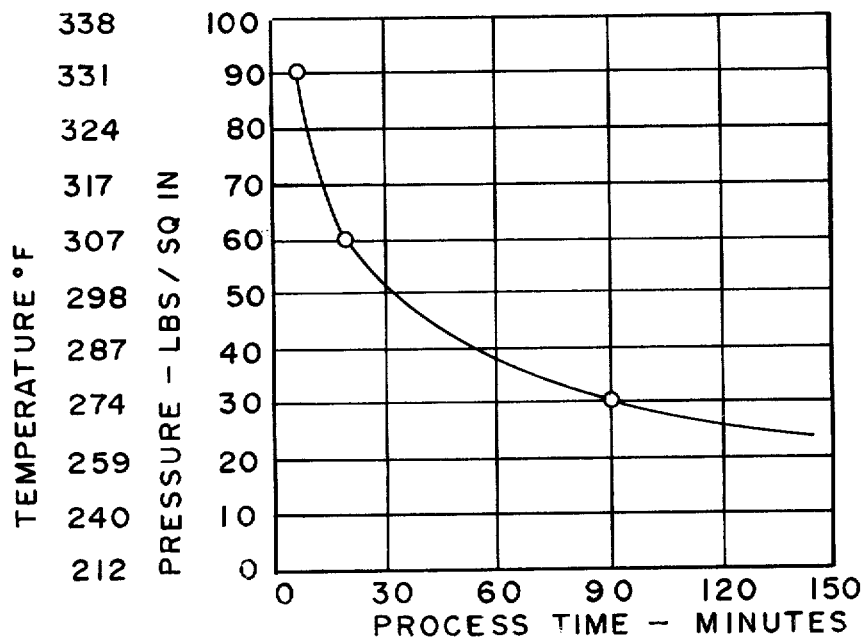
FIG. 4 provides a chart disclosing the relationship between hydrolyzing temperature and the time required to achieve a 70% pepsin digestibility through direct steam injection.

In referring to FIG. 1, there is disclosed the hydrolyzing apparatus 1 of this invention, and which comprises a vessel 2, which may be more descriptively defined as a fluidizer vessel, having a central cavity 3 throughout its extent, and being surrounded by a jacket 4, more aptly disclosed as a steam jacket, and into which the hydrolyzable material, such as feathers or other keratinaceous materials, may be inserted and processed to render them more flowable, in the manner as previously explained. An inlet 5 is provided at one end of the vessel 2, and this inlet functions as chute into which the unprocessed and raw feathers may be initially fed to commence the hydrolyzing process. Some water may be introduced at the same time through this inlet. Mounted, as by means of the bearings 6 and 7, at either end of the vessel 2, is a shaft 8 concentrically aligned throughout the length of vessel 2, and which shaft incorporates a plurality of agitating means 9, such as the paddles as shown, for providing the violent agitation to the moistened feathers that are injected into the apparatus through its intake chute 5. These paddles may be slightly inclined also to furnish some movement of the mass along the length of the vessel and to its discharge. At the opposite end of the vessel 2 is the fluidizer discharge chute 10 which incorporates an adjustable overflow weir, as at 11, for the purpose of controlling the flow of the fluidizing material through the vessel 2, as during its processing.

In the working model of this invention, the vessel 2 is approximately eight feet to twelve feet in length, and approximately one and one-half to three feet in diameter. Its agitation shaft 8 is designed for revolving, as by means of a motor (not shown), within a range of approximately 150 to 350 rpm, and preferably within the vicinity of 250 rpm. Its steam jacket is designed for easily accommodating the preferred pressures in the vicinity of 70 to 120 pounds per square inch of steam pressure, so as to generate a preferred temperature therein of approximately 320° F. to 355° F., which in turn convects a heat within the vessel 2, without creating any pressure therein, to a temperature of less than 212° F. But, conceivably the process will yet operate within a pressure range of 25 to 200 psig, providing jacket temperatures of between 265° F. to 390° F.

Since dry feathers, as an example, are only about 20% water, the balance comprises a surface moisture that is normally upon the feathers as they are delivered to a hydrolyzer. Feathers are usually delivered to the renderer quite wet, but if not, then some small quantity of water may be added with the feathers as they are introduced into the inlet 5, as previously explained.

The essential function of this fluidizer, or the vessel 2, is to convert the large, stiff, and dry feathers into a pumpable consistency, in an efficient manner, and to introduce them into a continuous flow pattern. This is accomplished by creating a hot, steamy, and water saturated space, at atmospheric pressure, within the fluidizer, wherein the feathers are also violently beaten by the paddle means 9 which are being rotated at high speeds as previously defined. The water vapor, at atmospheric saturation temperature, of about 210° F., but not over 212° F., removes the waxy coating from the feathers, as previously analyzed, and then wilts the feathers, making them limp and less tough, and in addition, reduces their particle size substantially down to less than the one-half inch category as previously analyzed with respect to the data contained in the summary of this invention. The primary heat for producing the vapor within the fluidizer is provided by the steam jacket, which is normally supplied with steam under pressure, but, it must recognized that a heat source of other energy could be utilized just as well, whether it be of hot oil, electricity, or the like.

The degree of fluidization accomplished within the vessel 2 is dependent upon the jacket temperature, the violence of its agitation, and the time of retention of the feathers therein. Typically, the retention time of moist feathers within the fluidizer 2 of this invention is somewhere within the range of 10 to 15 minutes, or substantially less than that required to attain like processing of feathers in the prior art devices. The uniqueness of the current invention, and the treatment it provides for feathers, lies in the nonpressurization of the feathers in the fluidizer vessel, and secondly, the violence of agitation within said vessel so as to attain a high degree of material break-up, to accelerate its softening at relatively low temperatures, and within a significantly short time. Little or no hydrolyzation takes place within the fluidizer vessel of this invention, mainly because of the relatively low temperature involved. The feathers, for example, are reduced from their original physical condition, most of them having been within a range of one to six inches long, stiff, and completely inflexible, to a variety of small, wet, soggy, and limp pieces, mostly now less than one-half inch in length, with only a few of them remaining up to two inches in length. The product at this stage becomes much more compact, semiflowable, and as a result, the fluidizer increases the bulk density of the feather mass from roughly 30 to 40 pounds per cubic foot. In this condition, the feathers will flow much easier through the vessel 2 by means of the inclined agitating means, or the paddles 9, and at the same time, by gravity will flow under the influence of the suction from a pump, such as a screw type pump or the like.

At the discharge chute 10 of the apparatus 1, the slurry-like mass of small feather pieces, or other keratinaceous material, is urged by the suction of the pump 12, such as shown in FIG. 2, initially under the urging of its helical vane 13, and then into the influence of its rather rotor-like means 14, which cooperates within the complimentary and progressing cavity 15 for urging the fluidized mass of feathers towards the inlet dome 16 of the hydrolyzer vessel 17.

This pump 12 may be of any type of pumping means that is capable of building a pressure head upon the product that it pumps, and for purposes within this invention, being designed to provide for the pressurized flow of the fluidized feathers into the vessel 17, against the inherent pressure that has already built up within said vessel, during its operations, and at the same time to prevent the discharge or escape of any of the hydrolyzer vessel pressure from passing through the pump 12 and into the fluidizer, where pressure is not desired. Pumps of this nature may comprise the Tuthill Bump-Ulrich style of pump, manufactured by Tuthill Pump Company of Fort Wayne, Ind., but preferrably the Moyno pump, in this case being used as an infeed pump, and manufactured by Robbins & Myers Company, of Springfield, Ohio, has been found to be highly satisfactory, and this is the type of pump shown in operation within FIG. 1, and as disclosed more specifically in FIG. 2 of the drawings. In addition, the Impco Pump, as manufactured by Improved Machinery Co., of Nashua, N.H., may be used for purposes of this invention. Generally, the pump used within a preferred embodiment operates from an approximately 15 horsepower motor, so as to obtain the power required to achieve its desired results.

The fluidized feathers are then introduced by means of the pump 12 into the hydrolyzer vessel 17. This vessel incorporates an inner cavity 18, and has a steam jacket 19 surrounding it, and into which heat, normally supplied through steam, is supplied for providing for vaporization of some of the moisture that accompanies the fluidizing material that is being continuously sent into the vessel 17. The size dimensions for the hydrolyzer vessel, in the working model, are somewhat comparable to the dimensions for the fluidizer vessel 2. In addition, the vessel incorporates a shaft 20 throughout its length, which is bearing mounted by means of the bearings 21 and 22, and which shaft incorporates series of agitating means, such as the paddles 23, so as to provide agitation for the hydrolyzing material contained therein, while at the same time, and since the paddles may be slightly canted, also provides for an urging of the material towards the outlet conduit 24 of the apparatus.

The agitator within the hydrolyzer vessel 17 rotates typically within a range of 150 to 350 rpm, and again, providing a violent degree of agitation compared to the type of agitation normally furnished by prior art type devices. But it may be likely, in some instances, that the agitating means 23 within the hydrolyzer vessel will not be rotated in such a violent manner, but rather, may also be rotated within the range of 30 to 150 rpm, since the material will already have been substantially fluidized, reduced in size, substantially moistened, and rendered quite flowable, as a result of the agitating action transpiring within fluidizer vessel 2. But, and for purposes as previously explained, it may be desired, in many instances, to also violently agitate the hydrolyzing material within the vessel 17 so as to accelerate the hydrolyzing process, in the manner as previously explained in the summary of this invention.

It is within this vessel 17 that hydrolyzation is accomplished, at a temperature typically between 275° F. and 330° F., and that is, at a pressure typically between about 30 and 90 psig. But, it is likely that the temperature within this hydrolyzing vessel could range between 265° F. and 365° F., at respective pressures between about 25 to 150 psig, and still feasibly operate. Normally, the retention time within this vessel is in the vicinity of only 10 to 20 minutes, to attain a total hydrolyzation of the feather particles contained therein. The goal of this vessel, and for that matter the operation of this entire apparatus, is to attain a combination that yields maximum nutritional value for the end product at a reduced time. Indications are that the product processed in the manner of this invention, within this preferred embodiment, attains the desired pepsin digestibility, measured by the standard method utilizing 0.2% pepsin, in the neighborhood of about 75%, as previously explained, and this is developed through the agency of providing a violent agitation at the lowest feasible temperatures within this apparatus. The horsepower required to effect the violent agitation is not excessive, because of the constant rate of infeed and the pretreatment given to the feathers in the fluidizer, which greatly reduces their resistance to agitation.

The outflow of the hydrolyzed material is made by way of the outlet conduit 24, and through the outfeed pump 25. This outfeed pump 25 may also comprise a similar type of pump as shown in FIG. 2, but it is reversed in its operation and serves more in the nature of a metering device through which the pressure, as from within the vessel 17, is continuously throttled in the nature of a propelling or blowing of the hydrolyzed material through the pump and through the outfeed line 26 and to a dryer or the like (not shown). Little horsepower is required for the operation of this pump 25, something between about a 3 to 5 hp motor, since it is not effecting the propulsion of the product, but rather, is simply acting as a reverse head against the pressure within the vessel 17 so as to allow for the so-called throttling of the hydrolyzed feathers, and some vapor, out of the vessel continuously. And, since the steam jacket 19 surrounding the vessel 17, or any other heat source, has a tendency to continue the vaporization of the surface water being brought into the vessel 17 by means of a pump 12, such vaporization generates additional pressure continuously within the vessel 17 at the desired elevated temperatures that are required for attaining rapid hydrolyzation. In addition, since violent agitation may also occur within this vessel 17, hydrolyzation continues upon the product as it continuously flows through the same and by the time it reaches the vessel outlet end, as proximate the outlet conduit 24, the product will be fully hydrolyzed, and ready for dispersal to a dryer, other place of storage, or for shipment. The hydrolyzed material is directed through the outfeed line 26, and it may thus be transferred to a batch or continuous dryer, to be dried into a feather or other keratinaceous meal, or it may be combined with other by-products or offal, as aforesaid, in accordance with the common and nonproprietary practice, to be jointly dried into a combination meal, with or without subsequent press-out of a portion of its fat.

Variations in this invention, the structure of its apparatus, or the operation of its process, may occur to those skilled in the art upon reviewing the subject matter of this invention. Such variations, if within the spirit of the invention, are intended to be encompassed within the scope of any claims acquired within a U.S. patent upon the same. The description of the preferred embodiment set forth herein, and its dimensions and qualifications, are set forth specifically for illustrative purposes only.

Having thus described the invention what is claimed and desired to be secured by Letters Patent is:

1. The method of continuously hydrolyzing keratinaceous material comprising continuously delivering generally untreated such material to a vessel, heating the material within the laden vessel without a build-up of pressure to a temperature of not exceeding 212° F., violently agitating by beating the keratinaceous material in the said vessel through the rotation of agitating means to between about 150 to 350 rpm, continuing the violent agitation and heating of said material for a length of time required to beat the material to render it sufficiently wilted and to a flowable and pumpable consistency, continuously pumping the now flowable fluidized material from the said vessel and into a second vessel that is pressurized for hydrolyzation, heating the fluidized material while in the second vessel to a temperature of between about 265° F. to 365° F. and for a length of time to generate vaporization and incident pressure therein up to between about 25 to 150 psig, agitating the material in the second vessel for a period of time until hydrolyzation occurs, and then continuously pumping the hydrolyzed material from the said second vessel for eventual drying.

2. The process of claim 1 and wherein the keratinaceous material being hydrolyzed comprises feathers.

3. The invention of claim 2 and including heating a jacketed first vessel to a preferred jacket temperature of between about 320° F. to 355' F. by means of a jacket pressure preferrably between about 70 to 120 psig to effect heating of the feathers not above a temperature of about 212° F.

4. The invention of claim 2 and including heating a jacketed first vessel to a temperature of between about 265° F. to 390° F. by means of a jacket pressure between about 25 to 200 psig to effect heating of the feathers not above the temperature of about 212° F.

5. The invention of claim 1 and including adding water to the material before it is delivered into the first said vessel.

6. The invention of claim 2 and including continuously pumping the hydrolyzed feathers from the said second vessel while gradually providing for the simultaneous release of some of its generated pressure.

7. The invention of claim 6 and including generating additional pressure within the second said vessel to maintain the pressure therein at between 25 to 150 psig while some previously generated pressure and hydrolyzed feathers are being continuously discharged from the second said vessel.

8. The invention of claim 7 and wherein feathers are continuously traversing through the said first and second vessels during performance of the defined method.

9. The invention of claim 1 and including violently agitating by beating the feathers in the second vessel through rotation of agitating means to between about 150 to 350 rpm.

10. The invention of claim 1 and including continuously pumping the fluidized feathers from the first vessel and into the second vessel to prevent the escape of the sustained developed pressure from the second vessel and back into the first said vessel.

* * * * *